March 7, 1961 T. J. HAVILAND 2,974,275
TUBE HOLDER AND CONTACTOR FOR ELECTRICAL AND VIBRATION
TESTS OF SUB-MINIATURE RADIO TUBES
Filed March 5, 1952 3 Sheets-Sheet 1

INVENTOR.
THOMAS J. HAVILAND
BY
ATTORNEYS

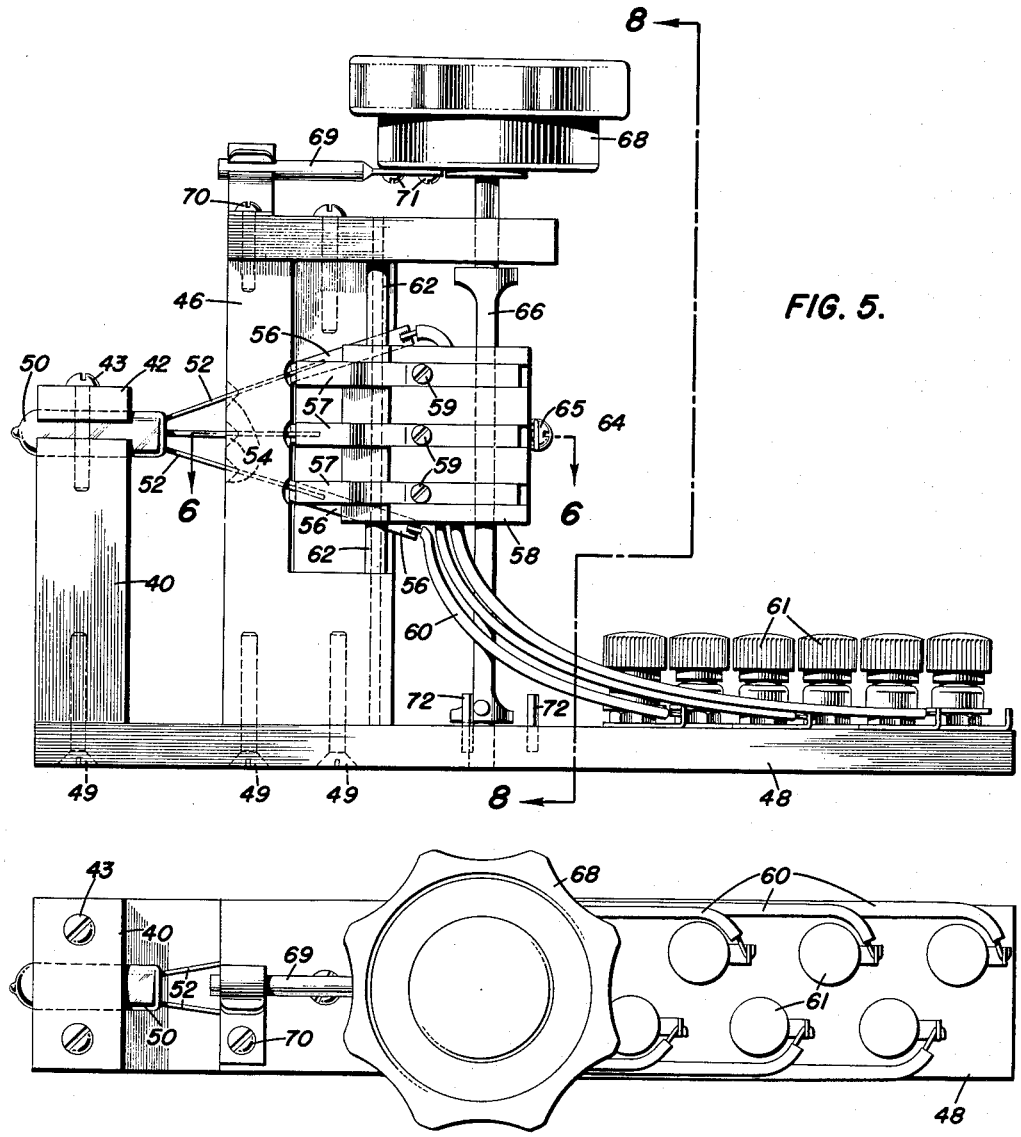

THOMAS J. HAVILAND
INVENTOR.

United States Patent Office 2,974,275
Patented Mar. 7, 1961

2,974,275

TUBE HOLDER AND CONTACTOR FOR ELECTRICAL AND VIBRATION TESTS OF SUB-MINIATURE RADIO TUBES

Thomas J. Haviland, Brookeville, Md., assignor to the United States of America as represented by the Secretary of the Navy Filed Mar. 5, 1952, Ser. No. 275,008

13 Claims. (Cl. 324—20)

This invention relates generally to an electron tube holder. More specifically, the invention relates to an improved tube holder which is more particularly adapted for testing sub-miniature electron tubes.

With the increased use of sub-miniature electron tubes in the telemetering system installed on remotely controlled test vehicles, it was discovered that vibration of the vehicle in flight caused many failures in the telemetering system. As a consequence, it became necessary to check each system by means of a shaking table before installation in the test vehicle. Often it was determined that failure of the system occurred only in the sub-miniature electron tubes utilized in the system, and that testing of the entire system was not necessary if some means for vibration testing the sub-miniature tubes could be developed.

It is, therefore, one object of the present invention to provide a tube holder for facilitating the easy and quick testing of sub-miniature electron tubes as to their mechanical characteristics.

A further object of the invention is to provide a means for testing sub-miniature electron tubes with regard to their mechanical characteristics without damaging the tube being tested.

And another object of this invention is to provide a tube holder which permits quick change of electron tubes being tested, and one whereby the tubes can be mechanically isolated from the rest of the circuit and electrically connected by flexible shielded leads. In accordance with a preferred embodiment of the invention, the tube holder comprises a base plate, a tube clamp mounted on the base plate, a terminal block, a second block, and a removable spring clamp for holding electrode leads of a tube against terminal strips of a multi-conductor cable. In a second embodiment of the invention, a cam actuator is used instead of a spring clamp. These arrangements thus provide quick, rugged connect and disconnect devices for testing sub-miniature electron tubes.

Other objects and many of the attendant advantages of this invention will be appreciated readily as the same becomes better understood by reference to the following detailed description, when considered in connection with the accompanying drawings, wherein:

Fig. 5 is a side elevation of a modified form of the sub-miniature tube holder.

Fig. 9 is a top view of the tube holder shown in Fig. 5.

Figure 1:
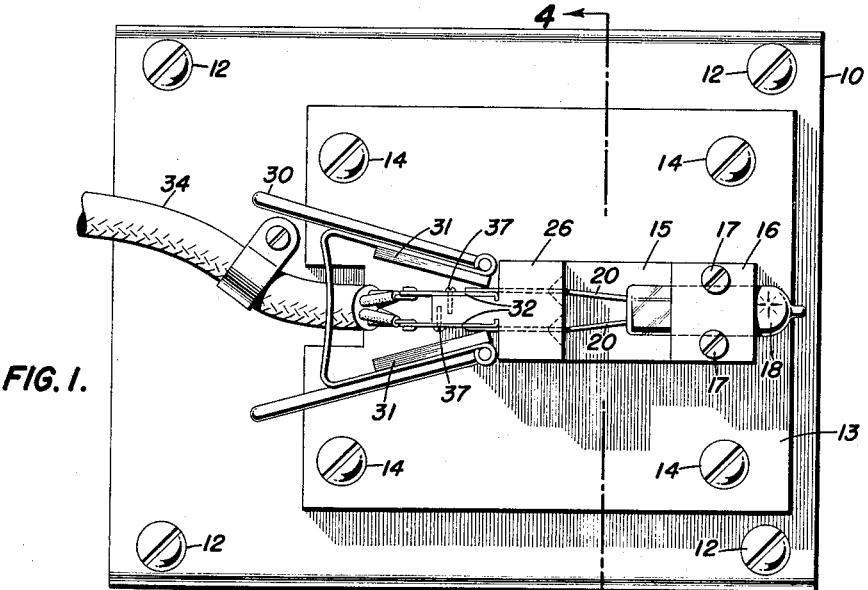
Fig. 1 is a top view of a sub-miniature tube holder constructed in accordance with the invention.

Referring now more specifically to Fig. 1, the reference numeral 10 indicates a portion of a table top or a mechanical shaker upon which the invention is mounted. This table top or mechanical shaker 10 is attached to a base 11 by means of screws 12.

Figure 2:
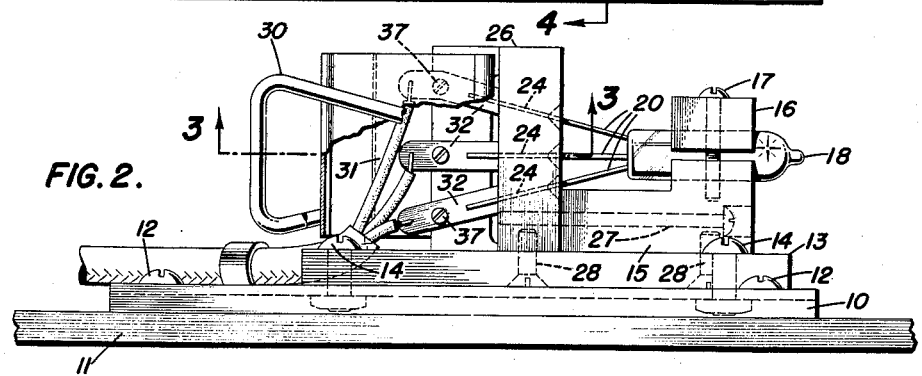
Fig. 2 is a side elevation of the tube holder shown in Fig. 1.
Figure 3:
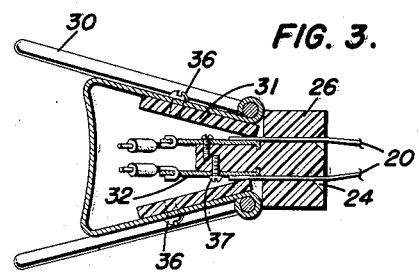
Fig. 3 is a cross-section on the plane 3—3 of Fig. 2.
Figure 4:
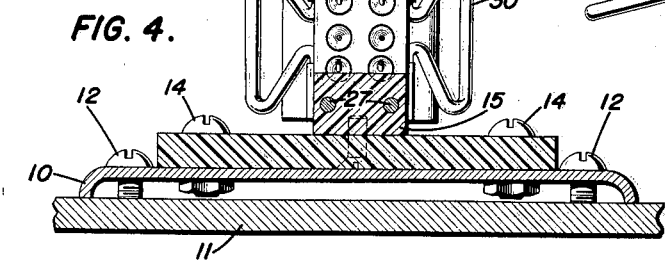
Fig. 4 is a cross-section of the tube holder taken through plane 4—4 of Fig. 1.
Figure 8:
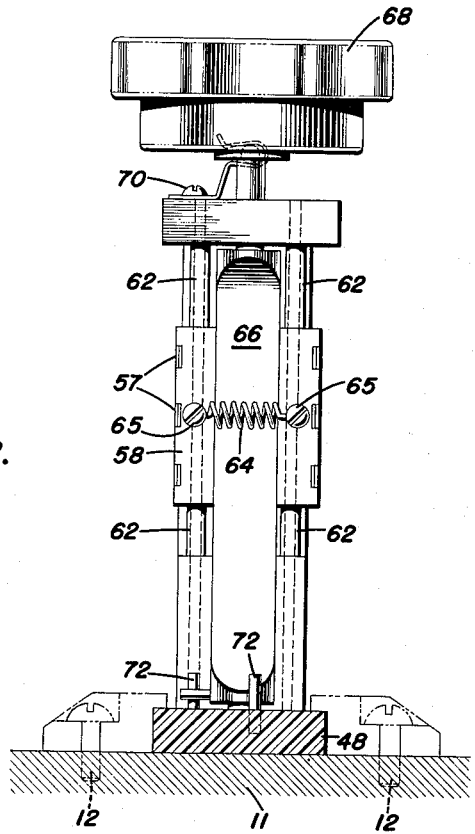
Fig. 8 is a cross-section of the modified tube holder taken through plane 8—8 of Fig. 5.

The invention comprises a base plate 13, which is attached to the table top 10 by screws 14, and which supports a tube mount 15 that is made of insulating material, such as Bakelite, and that, as is best shown in Fig. 2, has a removable top 16. Top 16 is secured to tube mount 15 by screw elements 17. Tube clamp 15 serves to support a sub-miniature electron tube 18 having a plurality of electrode leads 20 projecting from its base and extending through a like number of holes 24 cut in the face of a T-shaped terminal block 26 that is also mounted on base plate 13. Tube mount 15 and terminal block 26 are secured together by screw 27, and both, in turn, are attached to base plate 13 by screws 28.

Removably mounted on the stem of T-shaped block 26 is a clamp 30 which has its clamping jaws 31 faced with an insulating material and which retains electrode leads 20 against a like number of terminal strips 32 fixed to opposite faces of block 26. The terminal strips 32 are aligned with the holes 24 and are connected through a multi-conductor cable 34 to a power supply source and the electron tube input and output circuits. Clamping jaws 31 and terminal strips 32 are secured to clamp 30 and block 26 by screws 36 and 37, respectively.

In operation, top 16 is loosened and clamp 30 is removed adn a tube 18 placed in clamp 15 with its electrode leads 20 inserted through holes 24 and confronting terminal strips 32. Clamp 30 is then replaced, and the electrode leads 20 are firmly held against the terminal strips 32. The tube 18 can then be placed in operation and tested.

A modified form of the invention is illustrated in Figs. 5, 6, 7, 8 and 9. Fig. 5 which shows a sub-miniature electron tube clamp 40, having a removable top or cap 42 attached thereto by screws 43, and an elongated T-shaped terminal block 46 mounted on a common base plate 48. Tube clamp 40 and terminal block 46 are secured to base plate 48 by screws 49. Shown mounted in clamp 40 is a sub-miniature electron tube 50 having a plurality of electrode leads 52 inserted in an equal number of holes 54 formed in terminal block 46. The electrode leads 52 project through the terminal block 46 and confront a plurality of terminal strips 56 mounted on the stem of the T-shaped terminal block 46.

Normally confronting terminal strips 56 is a set of contactor strips 57 which are mounted on a pair of insulator plates 58 by screws 59. Strips 56 are connected, by an equal number of leads 60 to binding posts 61 which have power supply, input and output leads connected thereto.

Figures 6, 7:
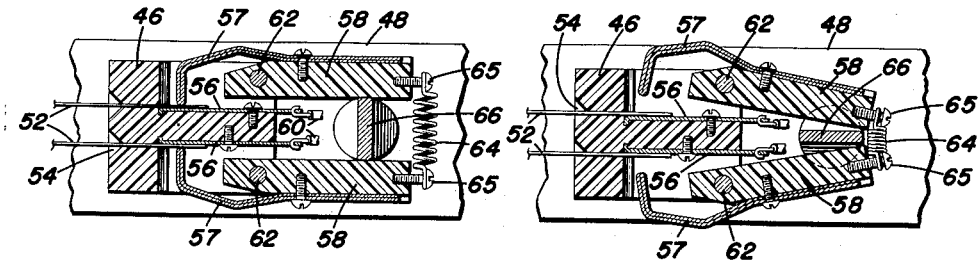
Fig. 6 is a cross section on the plane 6—6 of Fig. 5, and showing the tube holder in one of its operative positions.
Fig. 7 is a cross-section on the plane 6—6 of Fig. 5 showing the tube holder in its second operative position.

The insulator plates 58 are separately pivoted at corresponding ends on a pair of shafts 62 that are mounted in base 48, corresponding opposite ends of plates 58 being held in operative association by a bias spring 64. Spring 64 is attached to plates 58 by screws 65. As is best seen in Fig. 6, bias spring 64 normally urges contactor strips 57 away from terminal strips 56. A cam actuator 66 is mounted between the ends of the plates 58 and near the spring 64, and is rotatable for swinging the contactor strips 57 into engagement with the leads 52. The cam actuator 66 is mounted in the base plate 48 and carries a knob 68 at its upper end. Knob 68 is supported by a bracket arrangement 69, which is attached to terminal block 46 and knob 68 by screws 70 and 71. Suitable stops 72 are provided for limiting movement of the actuator 66.

As is best shown in Fig. 7, when cam actuator 66 is turned so that its flat faces are parallel to the planes of insulator plates 58, contactor strips 57 are lifted off of the electrode leads 52 by the bias spring 64, and the circuits to the tube under test are broken, and tube 50 may be withdrawn, upon loosening or removal of cap 42. Upon turning knob 68 through an angle of 90°, as shown in Fig. 6, bias spring 54 is stretched, and strips 57 are closed on the electrode leads 52.

Obviously many modifications and variations of the present invention are possible in the light of the above teachings. It is therefore to be understood that within the scope of the appended claims the invention may be practiced otherwise than as specifically described.

What is claimed is:

1. A connect-disconnect arrangement for testing an electron tube, comprising, a base plate, clamping support means mounted thereon for supporting said electron tube, a terminal block for receiving the electrode leads of said electron tube, said tube being mechanically isolated from terminal block and clamping means for holding said electrode leads of said tube against terminal strips for a multi-conductor cable.

2. An arrangement as set forth in claim 1, wherein said means for holding said electrode leads against said terminal strips of said multi-conductor cable comprises a removable spring clamp.

3. An arrangement as set forth in claim 1, wherein said means for holding said electrode leads against said terminal strips of said multi-conductor cable comprises fingers operated by a cam actuator.

4. A connect-disconnect arrangement for testing an electron tube, comprising, a base plate, clamping support means mounted thereon for supporting said electron tube, a terminal block having a plurality of apertures for receiving the electrode leads of said electron tube, and movable clamping means mounted on said terminal block for holding said electrode leads of said tube against terminal strips for a multi-conductor cable.

5. An arrangement as set forth in claim 4, wherein said terminal block is T-shaped.

6. An arrangement as set forth in claim 5, wherein said means for holding said electrode leads against said terminal strips comprises a removable clamp having its clamping jaws mounted one each on either side of the stem of said terminal block.

7. An arrangement as set forth in claim 6, wherein said terminal strips are mounted on the opposite sides of said terminal block.

8. An arrangement as set forth in claim 7, wherein the clamping jaws of said clamp are faced with an insulating material.

9. A connect-disconnect electron tube testing device, comprising, a base plate, clamping means mounted thereon for supporting said electron tube, a T-shaped terminal block also mounted on said support plate, said terminal block having a plurality of apertures therein through which extend the electrode leads of said electron tube, said terminal block having a plurality of terminal strips mounted on the stem thereof, insulating plate means having a plurality of contactor strips mounted thereon so as to contact said terminal strips, said contactor strips being connected by an equal number of leads to binding posts which have power supply, input and output leads connected thereto, and means for connecting and disconnecting said contactor strips to and from said terminal strips.

10. An arrangement as set forth in claim 9, wherein said insulating plate means comprise at least two pivotally mounted plates.

11. An arrangement as set forth in claim 10, wherein said means for connecting and disconnecting said contactor strips to and from said terminal strips comprises fingers operated by a cam actuator mounted between said pivotally mounted plates.

12. An arrangement as set forth in claim 11, and means for normally keeping said contactor strips from contacting said terminal strips.

13. An arrangement as set forth in claim 12, wherein said last mentioned means comprises a spring having its ends connected to said plates.

References Cited in the file of this patent

UNITED STATES PATENTS

| | | |
|---|---|---|
| 1,540,355 | Mathes | June 2, 1925 |
| 2,420,055 | Sanders | May 6, 1947 |
| 2,458,033 | Sterner | Jan. 4, 1949 |